UNITED STATES PATENT OFFICE.

CARL HOEPFNER, OF FRANKFORT-ON-THE-MAIN, GERMANY; HENRY ORTH, JR., ADMINISTRATOR OF SAID HOEPFNER, DECEASED.

PROCESS OF EXTRACTING COPPER AND NICKEL FROM SULFID COMPOUNDS.

SPECIFICATION forming part of Letters Patent No. 704,640, dated July 15, 1902.

Application filed July 27, 1900. Serial No. 25,050. (No specimens.)

*To all whom it may concern:*

Be it known that I, CARL HOEPFNER, a subject of the Emperor of Germany, residing at Frankfort-on-the-Main, in the Empire of Germany, have invented certain new and useful Improvements in Processes of Extraction and Separation of Copper and Nickel from Their Mixed Sulfid Ores and Mattes; and I do hereby declare the following to be a full, clear, and exact description of the invention, such as will enable others skilled in the art to which it appertains to make and use the same.

My invention relates to the extraction and separation of copper and nickel in a suitable form from their mixed sulfid ores and mattes.

Nickel-copper ores, like those of Sudbury, Canada, or mattes containing nickel and copper as sulfids, are treated as follows: These substances, ores or mattes, which I will designate as "raw material," are subjected to oxidizing roasting to convert the iron into oxid of iron and the copper, as far as possible, into sulfate of copper, part of the nickel being converted into sulfate and the rest remaining as sulfid. The sulfurous-acid gas formed during this operation may be used in a subsequent stage of the process and, if present in excess, for manufacture of sulfuric acid. The roasted ore is then ground and mixed with water or a solution containing such, so as to dissolve the sulfate of copper, which by the addition of a chlorid of an alkali metal, as sodium chlorid, is converted into cupric chlorid, $$CuSO_4 + 2NaCl = CuCl_2 + Na_2SO_4,$$

which is finally reduced to cuprous chlorid either by reaction with sulfurous acid, ($SO_2$,) previously formed in this process, or preferably by reaction at a temperature above normal with sulfid of nickel or of copper that may have escaped oxidation by roasting, $$2CuCl_2 + NiS = Cu_2Cl_2 + NiCl_2 + S$$

$$CuCl_2 + CuS = Cu_2Cl_2 + S$$

$$2H_2O + 2CuCl_2 + SO_2 = H_2SO_4 + 2HCl + Cu_2Cl_2.$$

The free acid formed according to the latter equation is very valuable for the dissolution of oxid of copper and nickel that has been formed during roasting. Thus by either of these methods or by both of them combined cuprous chlorid is formed. The solution is then drawn off the residues and the cuprous chlorid either partly or wholly precipitated by cooling, while the solution when not containing too much chlorid of alkali metal—say not more than about ten per cent. to fifteen per cent.—will keep very little of the cuprous chlorid in the solution, which will then practically contain only nickel chlorid and sulfate of alkali metal, which latter can be separated by cooling. This resulting solution, with the addition of fresh quantities of chlorid of alkali metal, can be used over and over again for leaching new quantities of roasted ore or matte and when sufficiently concentrated I precipitate cuprous chlorid, thereby being enriched in nickel. Finally there will be a solution concentrated in chlorid of nickel and sulfate of alkali metal, from which traces of copper and iron can be removed by well-known chemical methods, leaving a solution of nickel chlorid containing alkali-metal sulfate, which latter may be partly removed by cooling and partly by transforming it into a chlorid by chemical means, such as chlorid of calcium or barium, producing calcium sulfate or barium sulfate. The resulting chlorid-of-nickel solution can be electrolyzed to obtain the metal or can be treated with lime to precipitate the nickel in the form of oxid, salable as such, and produce calcium chlorid as a by-product. The cuprous chlorid obtained as a precipitate may be purified and sold or utilized electrolytically for the production of pure copper or chemically for the production of pure protoxid of copper.

Having thus described my invention, what I claim as new therein, and desire to secure by Letters Patent, is—

1. The process, which consists in oxidizing roasting copper and nickel sulfid ores or mattes, leaching the sulfate of copper formed, converting this into cupric chlorid and then into cuprous chlorid, dissolving the nickel salts in the residue by said cuprous chlorid, precipitating cuprous chlorid from the solutions formed and returning the resulting solution containing some cuprous chlorid into the cycle of operations, substantially as described.

2. The process, which consists in oxidizing roasting copper and nickel sulfid ores or mattes, thereby forming sulfurous-acid gas and sulfate of copper, dissolving the sulfate and converting this into cupric chlorid by means of alkali-metal chlorid, treating the cupric chlorid by means of roasted material containing nickel sulfid and oxid, thereby converting the cupric chlorid into cuprous chlorid and dissolving nickel compounds, precipitating and removing cuprous chlorid from the solution and returning the remaining solution containing alkali-metal chlorid, and some cuprous chlorid to treat fresh quantities of material, substantially as described.

3. The process, which consists in oxidizing roasting copper and nickel sulfid ores or mattes, thereby forming sulfurous-acid gas and sulfate of copper, dissolving the latter and converting it into cupric chlorid by means of an alkali-metal chlorid, converting the cupric into cuprous chlorid by means of incompletely-roasted material and sulfurous acid, thereby dissolving nickel salts from said roasted material and the leached residues, removing cuprous chlorid from said solution and treating new quantities of ore with the resulting solution containing some alkali-metal chlorid and cuprous chlorid, substantially as described.

4. The process, which consists in oxidizing roasting copper and nickel sulfid ores or mattes, thereby forming sulfurous-acid gas and copper sulfate, dissolving the latter and converting it into cupric chlorid by means of an alkali-metal chlorid, treating the cupric chlorid by means of incompletely-roasted material, thereby converting it into cuprous chlorid and dissolving nickel compounds, precipitating cuprous chlorid and sulfate of soda by cooling then recovering the nickel, returning the solution resulting from this last operation and treating new quantities of raw material, substantially as described.

5. The process, which consists in oxidizing roasting copper and nickel sulfid ores or mattes, thereby forming sulfurous-acid gas and sulfate of copper, dissolving the latter and converting it into cupric chlorid by adding an alkali-metal chlorid, converting cupric into cuprous chlorid by means of incompletely-roasted material at a temperature above normal, thereby dissolving nickel salts, cooling the solution and thereby precipitating cuprous chlorid and alkali-metal sulfate, finally precipitating nickel as oxid from said solution, substantially as described.

6. The process, which consists in oxidizing roasting copper and nickel sulfid ores or mattes, thereby forming sulfurous-acid gas and sulfate of copper, dissolving the latter and forming cupric chlorid by the addition of sodium chlorid and simultaneously forming sodium sulfate, converting cupric into cuprous chlorid by means of sulfurous acid and incompletely-roasted material at a temperature above normal, thereby dissolving nickel compounds, suitably lowering the temperature to precipitate first cuprous chlorid and then sodium sulfate and finally precipitating nickel as oxid by means of lime, substantially as described.

In testimony that I claim the foregoing as my invention I have signed my name in presence of two subscribing witnesses.

C. HOEPFNER.

Witnesses:
B. W. SOMMERS,
HENRY ORTH, Jr.